United States Patent
Nakamoto et al.

(10) Patent No.: US 6,678,586 B2
(45) Date of Patent: Jan. 13, 2004

(54) VEHICLE BUILT-IN ELECTRONIC CONTROL APPARATUS

(75) Inventors: Katsuya Nakamoto, Tokyo (JP); Mitsuhiro Kitta, Tokyo (JP); Kohji Hashimoto, Tokyo (JP); Hiroshi Gokan, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 93 days.

(21) Appl. No.: 09/838,208

(22) Filed: Apr. 20, 2001

(65) Prior Publication Data

US 2002/0040261 A1 Apr. 4, 2002

(30) Foreign Application Priority Data

Sep. 29, 2000 (JP) .................................. 2000-298351

(51) Int. Cl.⁷ ........................... G06F 17/00; G06G 7/70
(52) U.S. Cl. ..................... 701/1; 701/33; 701/102; 701/114; 701/115; 700/2; 714/30
(58) Field of Search ................... 701/36, 37, 1, 701/29, 33, 34, 31, 102, 115, 114; 710/14, 15, 5, 2, 3, 20, 61; 714/23, 30, 31, 10–12, 33; 307/10.1; 340/438, 439; 123/479, 690, 480, 406.16, 486

(56) References Cited

U.S. PATENT DOCUMENTS

| 4,760,275 A | * | 7/1988 | Sato et al. ............... 307/10.1 |
| 5,394,954 A | * | 3/1995 | Tashiro et al. ........... 123/361 |
| 5,481,456 A | * | 1/1996 | Ogura ...................... 477/97 |
| 5,526,267 A | * | 6/1996 | Sogawa .................... 701/114 |
| 5,563,788 A | * | 10/1996 | Yoon ....................... 701/114 |
| 5,812,880 A | * | 9/1998 | Goto et al. ............... 710/14 |
| 5,826,211 A | * | 10/1998 | Kobayashi ................ 701/115 |
| 5,916,296 A | * | 6/1999 | Honda ..................... 701/115 |
| 5,987,365 A | * | 11/1999 | Okamoto .................. 701/29 |
| 6,052,632 A | * | 4/2000 | Iihoshi et al. ............ 700/2 |
| 6,128,560 A | * | 10/2000 | Ishii ....................... 307/10.1 |
| 6,499,067 B1 | * | 12/2002 | Honda ..................... 710/5 |

FOREIGN PATENT DOCUMENTS

| JP | 5-81222 | 4/1993 | ........... G06F/15/16 |
| JP | 5-128065 | 5/1993 | ........... G06F/13/42 |
| JP | 8-339308 | 12/1996 | ........... G06F/11/00 |
| JP | 10-89141 | 4/1998 | ........... F02D/45/00 |

* cited by examiner

Primary Examiner—Jacques H. Louis-Jacques
(74) Attorney, Agent, or Firm—Sughrue Mion, PLLC

(57) ABSTRACT

In a vehicle built-in electronic control apparatus, second control programs are written, second RAM memory for calculation processing and second input/output ports, and a serial-parallel converter for full duplex two-way serial communication for mutually conducting data communications between the main CPU and the sub CPU in operation of the controlled vehicle, and at the time of starting operation of the controlled vehicle, a part of the control constants stored in the first nonvolatile memory is transferred to the second RAM memory through the serial-parallel converter for the serial communication and the sub CPU performs predetermined calculation based on the contents of the second control programs of the second nonvolatile memory and the contents of the control constants transferred to the second RAM memory.

8 Claims, 3 Drawing Sheets

VEHICLE BUILT-IN ELECTRONIC CONTROL APPARATUS

BACKGROUND OF THE INVENTION

1. Field of the Invention

This invention relates to, for example, an electronic control apparatus into which two CPUs (microprocessor) used for control of an engine for automobile are built, and particularly to an improved vehicle built-in electronic control apparatus suitable for communicating multiple data between a main CPU and a sub CPU using a serial communication function.

2. Description of the Related Art

A vehicle built-in electronic control apparatus comprising a main CPU for performing the whole control, a sub CPU for performing control targeted for a specific function and a serial communication function for conducting various data communications between both the CPUs is publicly known.

For example, in "engine control apparatus" disclosed in JP-A-10-89141, there is proposed means in which control data (control constant) of a sub microcomputer (sub CPU) is stored in flash memory (first nonvolatile memory) of a main microcomputer (main CPU) and is transferred to RAM memory of the sub microcomputer through serial communication at the time of starting of control and also data of the flash memory can be rewritten from an external writing device (external tool) and thus the control data of the sub microcomputer is indirectly written and set from the external writing device.

On the other hand, in "data communication apparatus" disclosed in JP-A-5-128065, there is described an engine control apparatus for sending digital data between a master CPU and a slave CPU using a clock signal for communication and a handshake signal, and the digital data is considered as various control information occurring in operation of the engine control apparatus.

In addition, as means related to the operation monitoring in an engine control apparatus using two CPUs connected through data buses, in "operation monitoring method of two CPUs" disclosed in, for example, JP-A-5-81222, there is proposed means in which runaway monitoring of a sub CPU is performed by a main CPU and runaway monitoring of the main CPU is performed by hardware by means of a watch dog timer circuit.

In the runaway monitoring, there is the means for resetting the CPU at the time of abnormal occurrence to restart it, and in "digital processing apparatus" disclosed in JP-A-8-339308, there is proposed means in which an abnormal occurrence is stored and it is set to a full stop state impossible to restart a CPU in normal reset and this full stop state is released by again turning on an operating power source.

In such conventional arts described above, in JP-A-10-89141, serial communication means is used for the purpose of downloading the control constant from the main microcomputer to the sub microcomputer in a batch manner at the time of starting operation, and other limited signals are directly passed from the sub microcomputer to the main microcomputer.

Also, in JP-A-5-128065, there is a problem in that there are no degrees of freedom for mutually communicating various data between the master CPU and the slave CPU.

Further, in JP-A-5-81222, only the restarting of the CPU at the time of runaway occurrence of the CPU may leave a problem, and on the contrary, the full stop of the CPU as disclosed in JP-A-8-339308 also causes a problem.

SUMMARY OF THE INVENTION

A first object of the invention is to provide serial communication means capable of transferring control constants at the time of starting operation or freely intercommunicating various data in operation by improving the problems as described above in a vehicle built-in electronic control apparatus comprising a main CPU and a sub CPU with shared functions.

A second object of the invention is to provide an additional function for performing runaway monitoring and communication abnormal monitoring of each CPU to make safe recovery from an abnormality in a vehicle built-in electronic control apparatus comprising two CPUs as described above.

To achieve the above objects, a vehicle built-in electronic control apparatus according to the invention, which is a vehicle built-in electronic control apparatus fed from a vehicle built-in battery through a power switch, comprises a main CPU including first nonvolatile memory in which at least first control programs and control constants in correspondence with a controlled vehicle are written from an external tool, first RAM memory for calculation processing and first input/output ports, a sub CPU including second nonvolatile memory in which second control programs are written, second RAM memory for calculation processing and second input/output ports, and a serial-parallel converter for full duplex two-way serial communication for mutually conducting data communications between the main CPU and the sub CPU in operation of the controlled vehicle, and at the time of starting operation of the controlled vehicle, apart of the control constants stored in the first nonvolatile memory is transferred to the second RAM memory through the serial-parallel converter for the serial communication and the sub CPU performs predetermined calculation based on the contents of the second control programs of the second nonvolatile memory and the contents of the control constants transferred to the second RAM memory.

Also, there are provided a second power terminal for feeding power to each the CPU and the memory, and a first power terminal which is connected to the vehicle built-in battery without intervention of the power switch and feeds power to at least the second RAM memory, and even when the power switch is broken, the contents of at least the second RAM memory are held by the feeding from the first power terminal.

Also, there is further provided third nonvolatile memory, and the contents of the second RAM memory are saved in the third nonvolatile memory at the time of breaking the power switch and are transferred from the third nonvolatile memory to the second RAM memory at the time of again turning on the power switch.

Also, the main CPU and the sub CPU comprise control constant sending means for sending the control constants stored in the first nonvolatile memory to the sub CPU when the contents of the first nonvolatile memory have been changed at the time of starting operation of the controlled vehicle, direct request means capable of performing an interruption request of data sending from the sending side CPU to the receiving side CPU when the contents of the first nonvolatile memory have not been changed, irregular data sending means for sending the sending data as irregular data in the case that the interruption request by this direct request means is absent but there is a need for interruption sending from the sending side CPU to the receiving side CPU and the case that there is no need for the interruption sending but a data request from the receiving side CPU to the sending side CPU is present, and regular data sending means for regularly sending the sending data as regular data in the case that all the interruption request by the direct request means, the need for the interruption sending and the data request from the receiving side CPU to the sending side CPU are absent.

Also, a direct memory access controller is connected to at least one data bus of the sides of the main CPU or the sub CPU and sending data received through the serial-parallel converter for the serial communication is stored in the receiving side RAM memory without intervention of the receiving side CPU.

Also, the main CPU and the sub CPU comprise sum check means for making an error check of received data by the serial-parallel converter for the serial communication in the receiving side CPU, resending request means for requesting the resending of the received data to the sending side CPU if this sum check means determines that an error is present in the received data, and time-out check means for determining whether an interval between sending start time from the sending side CPU to the receiving side CPU and verification answer receiving time of the received data from the sum check means is within a predetermined time interval or not.

Also, the main CPU comprises reset output means for monitoring a watch dog signal of the sub CPU and a time-out check result of communication and generating a reset pulse output at the time of operation abnormality of the sub CPU to restart the sub CPU, and a watch dog timer circuit for monitoring a watch dog signal of the main CPU and generating a reset pulse output at the time of operation abnormality to restart the main CPU.

Also, there are provided a memory element reset by breaking or again turning on the power switch while storing generation of the reset pulse output, an output stop circuit for stopping a driving of a part of loads in response to an operation of this memory element, and alarm and indication means for giving an alarm and indication of operation abnormality in response to the operation of the memory element.

DETAILED DESCRIPTION OF THE PREFERRED EMBODIMENTS

Figure 1:
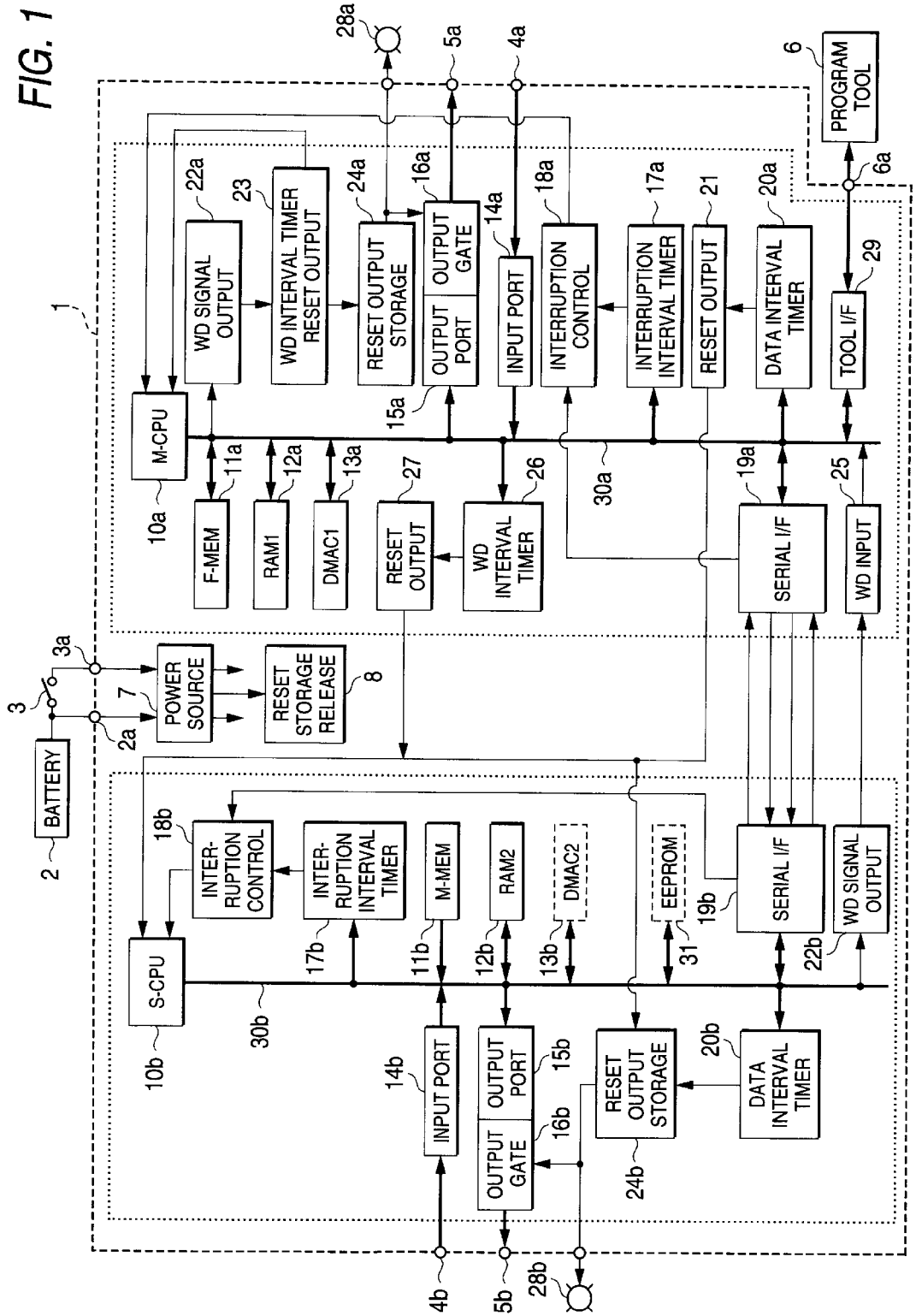
FIG. 1 is a block circuit diagram showing a vehicle built-in electronic control apparatus according to an embodiment of the invention.

FIG. 1 showing a block circuit diagram of a vehicle built-in electronic control apparatus according to an embodiment of the invention will be described below.

In FIG. 1, numeral 1 is a vehicle built-in electronic control apparatus comprising a main CPU 10a and a sub CPU 10b described later, and numeral 2 is a vehicle built-in battery with, for example, a DC 12V system for feeding power to the vehicle built-in electronic control apparatus 1 through a first power terminal 2a, and numeral 3 is a power switch such as an ignition switch connected between said vehicle built-in battery and a second power terminal 3a, and an output contact of an electromagnetic relay driven by an ignition switch may be used as said power switch.

Numerals 4a, 4b are first and second input terminal groups to multiple on-off signal switches or analog signals supplied to the side of the main CPU 10a or the sub CPU 10b, and numerals 5a, 5b are first and second output terminal groups to multiple vehicle built-in loads driven from the side of the main CPU 10a or the sub CPU 10b, and numeral 6 is an external tool which is connected through a connection terminal 6a at the time of product shipment or maintenance and inspection and writes control programs or control constants in correspondence with types of controlled vehicles to the vehicle built-in electronic control apparatus 1.

Numeral 7 is a power unit which is fed from the first power terminal 2a and the second power terminal 3a and generates a constant voltage for control of DC 5V, 3.3V and so on, and numeral 8 is a one-shot timer for generating a short-time pulse at the time of turning on or turning off the power switch 3, and it is constructed so that reset output memory of memory elements 24a, 24b described below is reset by an output pulse of said one-shot timer.

Numeral 10a is a main CPU for serving the whole control function and said main CPU is connected to the following various devices through a first data bus 30a.

Numeral 11a is first nonvolatile memory such as flash memory in which control programs or control constants are previously written from the external tool 6, and numeral 12a is first RAM memory for calculation processing in which various data is read and written, and numeral 13a is a direct memory access controller (DMAC) for detecting timing in which the main CPU 10a is in operation of internal calculation and does not perform input/output processing with the first data bus 30a and conducting data communications directly between a serial-parallel converter 19a described below and the first RAM memory 12a, and said DMAC is suitable for high-speed communication of a large amount of data without depending on the main CPU 10a.

Numeral 14a is a first input port for connecting an input signal from the first input terminal groups 4a to the first data bus 30a, and numeral 15a is a first output port for supplying a control output from the first data bus 30a to the first output terminal groups 5a, and numeral 16a is a first output gate for stopping a part of the control output and said output gate is intended to stop the control output in a state of being limited to a specific load when a first memory element 24a described below is in operation.

Numeral 17a is first interruption interval timer means for supplying an interruption control signal to the main CPU 10a through first interruption control means 18a in order to direct an operation start of serial communication described below, and numeral 19a is a serial-parallel converter for full duplex serial communication and said serial-parallel converter is intended to conduct serial data communications with a serial-parallel converter 19b of the opposed side through signal lines of send data SD, receive data RD, request to send RS, or clear to send CS.

Numeral 20a is first data interval timer means for measuring time from sending of serial data to acquisition of received verification of the opposed side, and numeral 21 is reset output means which acts in the case that the communication time is a time-out of a predetermined value or longer and resets the sub CPU 10b to restart it, and numeral 22a is a first watch dog signal for generating a pulse train with a predetermined cycle when the main CPU 10a is in normal operation, and numeral 23 is a watch dog timer circuit for supplying a reset pulse output to the main CPU 10a to restart the main CPU 10a when a pulse time width of said watch dog signal exceeds a predetermined value, and numeral 24a is a first memory element for storing the fact that said watch dog timer circuit has generated the reset pulse output, and the watch dog timer circuit is hardware provided in the outside of the main CPU 10a.

Incidentally, it is constructed so that in a range from reset to restart of the main CPU 10a, all the control outputs of the side of the main CPU 10a are made in an open state by hardware (not shown) and operations of the safe side are performed by pull-up or pull-down resistors.

Numeral 25 is a watch dog input signal for supplying a watch dog signal 22b generated by the sub CPU 10b to the main CPU 10a, and numeral 26 is watch dog interval timer means for supplying a reset pulse output to the sub CPU 10b through reset output means 27 to restart the sub CPU 10b when a pulse time width of said watch dog input signal exceeds a predetermined value.

Incidentally, numeral 28a is an alarm and indicator for responding when the first memory element 24a stores a reset output, and numeral 29 is a tool interface connected between the external tool 6 and the first data bus 30a.

Numeral 10b is a sub CPU for serving a specific control function and said sub CPU is connected to the following various devices through a second data bus 30b.

Numeral 11b is second nonvolatile memory such as mask ROM in which control programs or fixed control constants of the sub CPU 10b are previously written, and numeral 12b is second RAM memory for calculation processing in which various data is read and written, and numeral 13b is a direct memory access controller (DMAC) which is provided as necessary and detects timing in which the sub CPU 10b is in operation of internal calculation and does not perform input/output processing with the second data bus 30b and conducts data communications directly between a serial-parallel converter 19b described below and the second RAM memory 12b, and said DMAC is suitable for high-speed communication of a large amount of data without depending on the sub CPU 10b.

Numeral 14b is a second input port for connecting an input signal from the second input terminal groups 4b to the second data bus 30b, and numeral 15b is a second output port for supplying a control output from the second data bus 30b to the second output terminal groups 5b, and numeral 16b is a second output gate for stopping a part of the control output and said output gate is intended to stop the control output in a state of being limited to a specific load when a second memory element 24b described below is in operation.

Numeral 17b is second interruption interval timer means for supplying an interruption control signal to the sub CPU 10b through second interruption control means 18b in order to direct an operation start of serial communication described below, and numeral 19b is a serial-parallel converter for full duplex serial communication and said serial-parallel converter is intended to conduct serial data communications with the serial-parallel converter 19a of the opposed side through signal lines of send data SD, receive data RD, request to send RS, or clear to send CS.

Numeral 20b is second data interval timer means for measuring time from sending of serial data to acquisition of received verification of the opposed side, and numeral 22b is a second watch dog signal for generating a pulse train with a predetermined cycle when the sub CPU 10b is in normal operation, and numeral 24b is a second memory element for storing the fact that the reset output means 21 or 27 supplies a reset pulse to the sub CPU 10b or the second data interval timer 20b has been a time-out.

Incidentally, it is constructed so that in a range from reset to restart of the sub CPU 10b, all the control outputs of the side of the sub CPU 10b are made in an open state by hardware (not shown) and operations of the safe side are performed by pull-up or pull-down resistors.

Also, numeral 28b is an alarm and indicator for responding when the second memory element 24b stores a reset output, and numeral 31 is third nonvolatile memory such as EE-PROM provided as necessary.

In the apparatus of one embodiment of the invention constructed as shown in FIG. 1, a summary of the functions and operations will be first described by way of FIG. 1.

The vehicle built-in electronic control apparatus 1 described herein is, for example, a control apparatus of an engine for automobile, and a signal input for performing high-speed operations of, for example, a crank angle sensor of the engine is connected to the first input port 14a connected to the main CPU 10a, and a load for performing high-speed operations of an ignition coil of the engine or a solenoid valve for fuel injection is connected to the first output port 15a.

Also, a signal input for performing relatively low-speed operations of a position sensor of a selector lever or a water temperature and exhaust gas sensor is connected to the second input port 14b connected to the sub CPU 10b, and a load for performing low-speed operations of a solenoid valve for transmission or an electromagnetic clutch for air conditioner is connected to the second output port 15b.

The main CPU 10a operates based on control programs or control constants previously written from the external tool 6 to the first nonvolatile memory 11a and generates a control output to the first and second output ports 15a and 15b in response to an input signal from the first and second input ports 14a and 14b, and the control programs or the control constants are contents depending on types of controlled vehicle.

The sub CPU 10b is constructed so that on-off states of multiple input signals inputted from the second input port 14b or digitized analog signals are supplied to the main CPU 10a or a part of the control outputs of the main CPU 10a is supplied to a vehicle built-in load through the second output port 15b while sharing specific functions such as a function of checking the presence or absence of a broken wire of input/output signals or a digital filter function to multiple input signals.

The control programs or fixed control constants of the sub CPU 10b are stored in the second nonvolatile memory 11b and the contents do not depend on types of controlled vehicle.

However, it is constructed so that a part of the control constants such as a digital filter constant can be transferred from the first nonvolatile memory 11a to the second RAM memory 12b and be changed in correspondence with types of controlled vehicle.

Also, it is constructed so that a part of the control programs stored in the second nonvolatile memory 11b can be selected and used by types of controlled vehicle and this selection information is also transferred from the first nonvolatile memory 11a to the second RAM memory 12b and the sub CPU 10b operates on the contents of the second nonvolatile memory 11b referring to the contents of the second RAM memory 12b.

The control programs serving as a basis of operations thus are previously stored in second nonvolatile memory 11b, so that data transferred from the first nonvolatile memory 11a to the second RAM memory 12b reduces and also, the control programs are prevented from disappearing due to an abnormal decrease in a power voltage or noise.

The serial-parallel converters 19a and 19b for serial communication operate based on transmission control procedures defined by, for example, JIS-C6362, and a description of micro level operations of prompting readout of data to the main CPU 10a or the sub CPU 10b through the first and second interruption control means 18a and 18b when predetermined data is stored in buffer memory with the limited capacity built into the serial-parallel converters 19a and 19b is omitted.

Data communications at a macro level between both the CPUs will be described later by FIGS. 2 and 3, and the contents of data to communicate are classified as follows.

Sending data from main CPU to sub CPU
AA: Data spontaneously sent by the main CPU
AA1: The control programs or the control constants are written from the external tool 6 to the first nonvolatile memory 11a or necessary control data is sent in a batch manner to the sub CPU 10b at the time of rewriting change. (at the time of starting operation)
AA2: Control output signal to the second output port 15b (at all times during operation)
AA3: A part of the control constants is modified by a learning result or there is status information of the main CPU 10a that has changed during operation. (at the proper time during operation)
AA4: Sending request contents to the sub CPU (at the proper time during operation)
AB: Data sent by a request from the sub CPU
AB1: In case that a sum check error occurs in the control constants stored in the second RAM memory 12b (at the time of starting operation and at the proper time during operation)
AB2: Status information of the main CPU 10a (at the proper time during operation)
Sending data from sub CPU to main CPU
BB: Data spontaneously sent by the sub CPU
BB2: Input signal to the second input port 14b (at all times during operation)
BB3: Status information of the sub CPU 10b that has changed during operation or error code information by input/output diagnosis (at the proper time during operation)
BB4: Sending request contents to the main CPU (at the proper time during operation) or control constant sending request in case that an error occurs in error check of the control constants stored in the second RAM memory 12b (at the time of starting operation)
BA: Data sent by a request from the main CPU
BA2: Status information of the sub CPU 10b (at the proper time during operation)

Incidentally, the contents of the second RAM memory 12b are held by feeding from the first power terminal 2a even during operation stop, so that a transfer of the control constants from the main CPU 10a to the sub CPU 10b will generally be sufficient by only one time of the AA1 mode unless an abnormal decrease in a voltage of the vehicle built-in battery 2 or opening of a battery terminal occurs.

Also, at the time of starting operation, there is no problem during a slight period of time from power-on of the power switch 3 to starting of an engine even when the vehicle built-in electronic control apparatus 1 cannot perform engine control, and this period is a state in which each the CPU can concentrate on the transfer of the control constants.

Thus, there is no need for the second DMAC 13b when sending data in relation to the AA2 mode from the main CPU 10a to the sub CPU 10b is small.

On the other hand, in the main CPU 10a, runaway monitoring is performed by the watch dog timer circuit 23 and under abnormal conditions of operation, the main CPU 10a is automatically reset and restarted, but runaway monitoring of the sub CPU 10b is performed by the main CPU 10a and under abnormal conditions of operation, the sub CPU 10b is automatically reset and restarted by the reset output means 27 and also, the sub CPU 10b is automatically reset and restarted by the reset output means 21 in relation to a communication abnormality (time-out) of the side of the sub CPU 10b.

On the contrary, in relation to a communication abnormality (time-out) of the side of the main CPU 10a, it is constructed so that the second memory element 24b stores operations by the second data interval timer 20b and reset and restart processing of the main CPU 10a is not performed and as self-defense, output of a part of the second output gate 16b is stopped or the second alarm and indicator 28b is operated.

In case that each the CPU runs away due to noise, restarting is automatically made by a reset pulse output and recovery is generally made without being noticed by an operator, but in relation to advanced functions concerned with safety or convenient functions, driving of a load is stopped by the first and second output gates 16a and 16b which are output stop circuits and the operator is warned of this state by the first and second alarm and indicators 28a and 28b.

Since such an output stop state does not recover unless the power switch 3 is broken to stop operation of a vehicle, it is considered so that the operator is recognizable and maintenance and inspection can be prompted.

However, to stop driving of all the loads at the time of abnormal occurrence is conversely dangerous and output stops are limited to only the specific output described above.

It is constructed so that a runaway occurrence or a communication abnormality can be recognized by the alarm and indicators 28a and 28b even in case that a proper load for making the output stop is absent.

Figure 2:
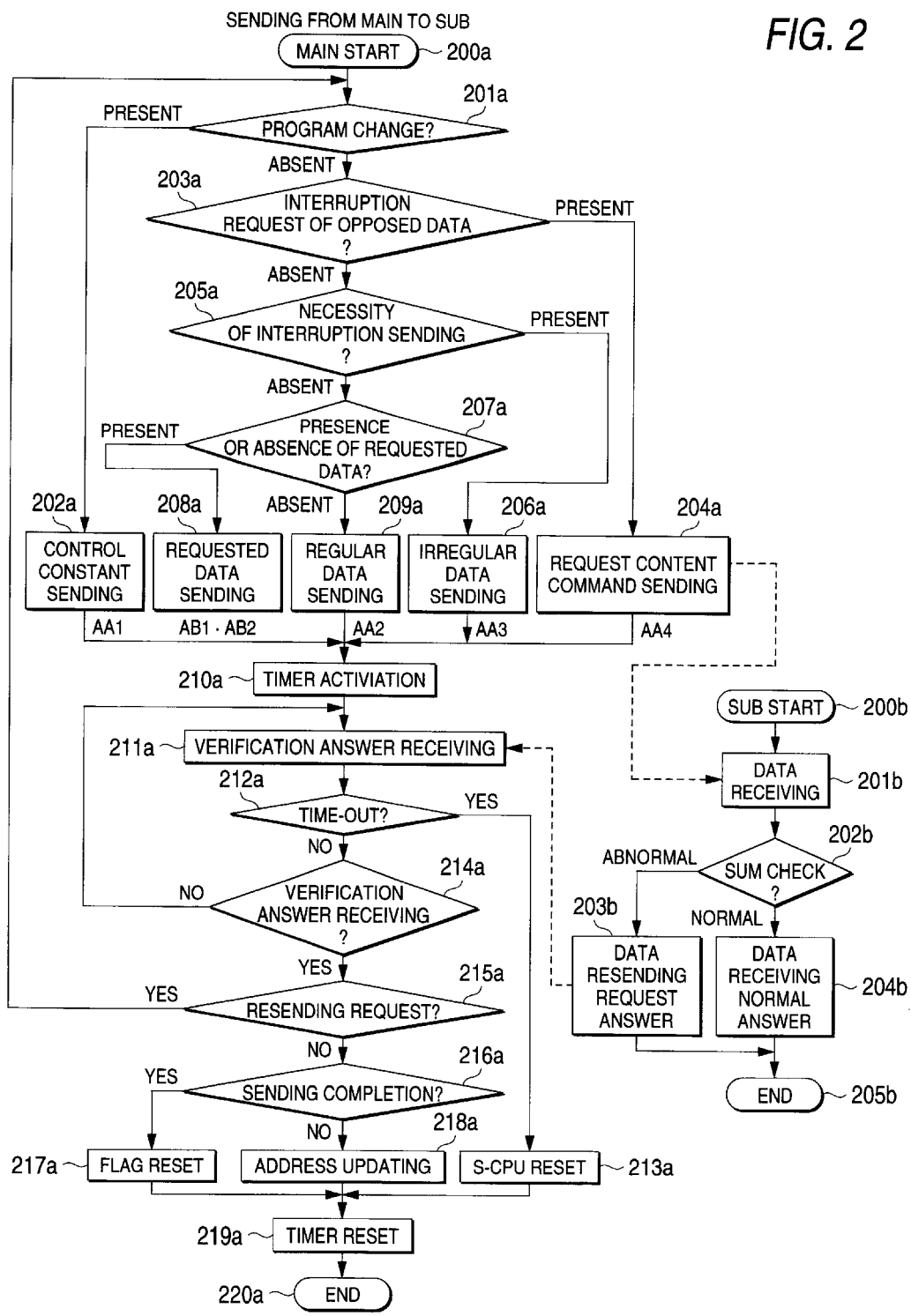
FIG. 2 is a flowchart illustrating communication operations between CPUs of the vehicle built-in electronic control apparatus according to the embodiment of the invention.

FIG. 2 is a flowchart for description of operations about data sending from the main CPU 10a to the sub CPU 10b.

In FIG. 2, step 200a is an operation start step activated by an occurrence of an interruption to the main CPU 10a in response to an operation of the first interruption interval timer means 17a in FIG. 1, and step 201a is a step of determining a state of a flag (not shown) for storing whether or not there is a state immediately after a program change such as writing or rewriting of control programs or control constants is made to the first nonvolatile memory 11a, and step 202a is a step of acting if step 201a determines that there is the state immediately after the program change is made and sending the control constants of the sub CPU 10b written in the first nonvolatile memory 11a.

Step 203a is a step of acting if the program change is absent instep 201a and determining a state of a flag (not shown) for storing whether any data sending is directly requested to the opposed CPU or not, and step 204a is a step of acting if the sending request is present in step 203a and sending a request content command of an address of sending request data, and step 205a is a step of acting if the sending request is absent in step 203a and determining a state of a flag (not shown) for storing necessity whether data desired to send relative to the opposed CPU by an interruption is present or not.

Step 206a is a step of acting if the necessity of interruption sending is present in step 205a and sending irregular data, and step 207a is a step of acting if the necessity is absent in step 205*a* and determining a state of a flag (not shown) for storing whether data sending has been requested by an interruption from the opposed CPU or not, and step 208*a* is a step of acting if the requested data is present in step 207*a* and sending the requested data, and step 209*a* is a step of acting if the requested data is absent in step 207*a* and sending regular data, and step 210*a* is a step of acting if the data or command has been sent in steps 202*a*, 204*a*, 206*a*, 208*a*, 209*a* and starting the first data interval timer 20*a* in FIG. 1.

Incidentally, various kinds of the sending data are constructed of a command showing the contents or a frame configuration of the sending data, an address of the sending data or data stored in said address.

On the other hand, step 200*b* is an operation start step of the side of the sub CPU 10*b*, and said start step is activated in response to an operation of the second serial-parallel converter 19*b* and the second interruption control means 18*b* in FIG. 1.

Step 201*b* is a step of receiving various kinds of sending data or sending commands from the main CPU 10*a* in the side of the sub CPU 10*b*, and step 202*b* is a determination step of checking the contents of a series of data received in step 201*b*, and step 203*b* is a step of acting if the received data is abnormal in step 202*b* and sending a resending request as an answer to the main CPU 10*a*, and step 204*b* is a step of acting if the received data is normal in step 202*b* and sending the fact that the data has normally been received as an answer to the main CPU 10*a*, and step 205*b* is an operation end step.

Figure 3:
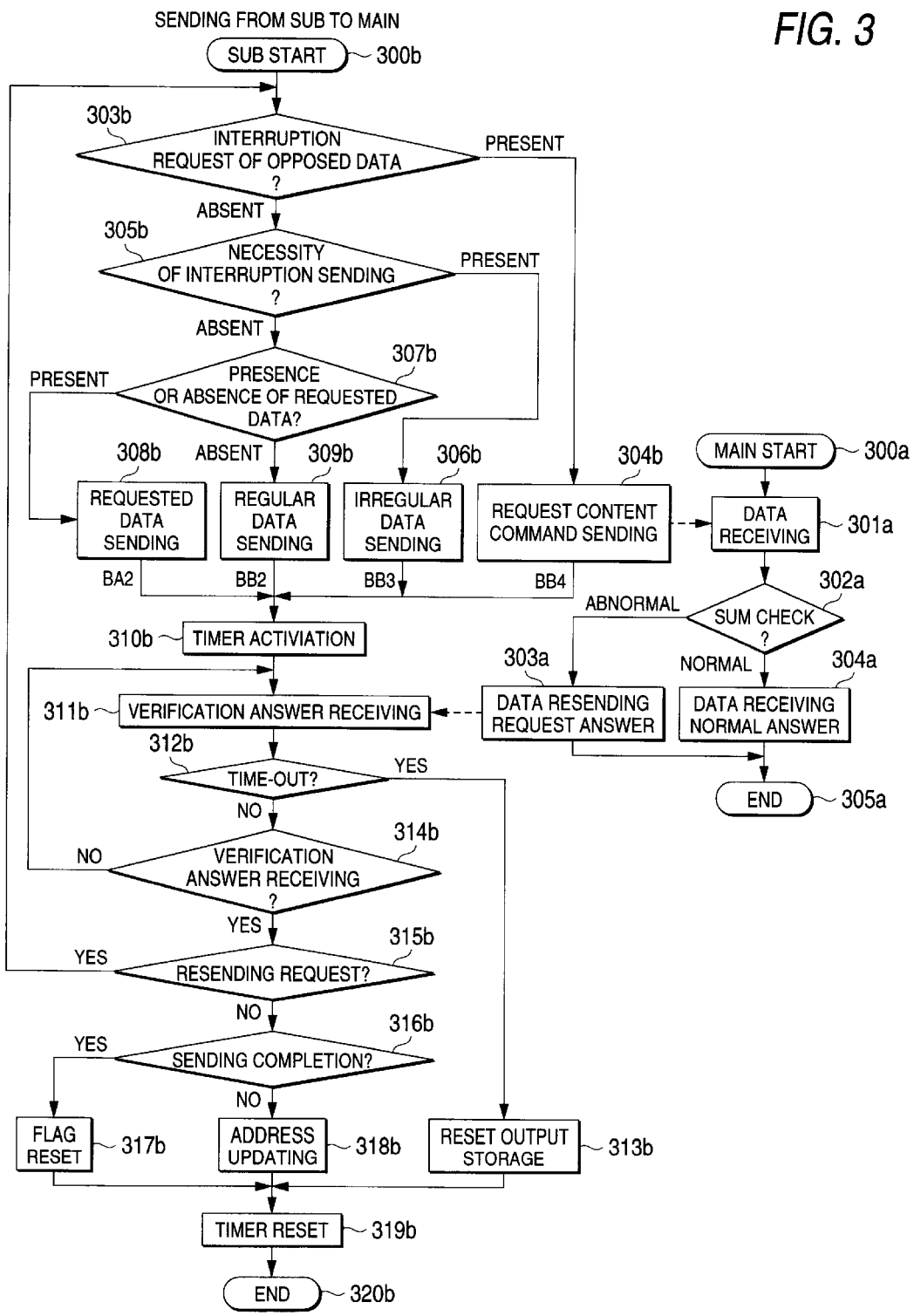
FIG. 3 is a flowchart illustrating communication operations between CPUs of the vehicle built-in electronic control apparatus according to the embodiment of the invention.

Incidentally, sending of verification answer information in step 203*b* or step 204*b* is performed by an interruption during an interim of various data sending of the side of sub CPU 10*b* in FIG. 3.

Step 211*a* of the side of the main CPU 10*a* is a step of receiving a verification answer from the side of the sub CPU 10*b*, and step 212*a* is a step of determining whether the first data interval timer 20*a* activated in step 210*a* exceeds predetermined time or not, and step 213*a* is a step of acting if step 212*a* determines that a time-out has occurred and resetting to restart the sub CPU 10*b* by the reset output means 21 of FIG. 1, and step 214*a* is a determination step of acting if a time-out has not occurred in step 212*a* and returning to step 211*a* if the verification answer from the sub CPU 10*b* is not received and proceeding to step 215*a* if the verification answer is received, and step 215*a* is a determination step of returning to step 201*a* if the contents of the verification answer in step 211*a* are a data resending request and proceeding to step 216*a* if the contents of the verification answer are a normal receiving.

Step 216*a* is a step of determining a state of a flag (not shown) for storing whether a series of sending has been completed or not, and step 217*a* is a step of acting if step 216*a* determines that the sending has been completed and resetting various kinds of the flags, and step 218*a* is a step of acting if step 216*a* determines that the sending has not been completed and updating to set an address of data to be sent subsequently, and step 219*a* is a step of operating subsequent to steps 213*a*, 217*a*, 218*a* and resetting the first data interval timer 20*a* activated in step 210*a*, and step 220*a* is an end step subsequent to this.

Incidentally, step 202*a* is control constant sending means, and step 202*b* is sum check means, and step 203*b* is resending request means, and step 204*a* is direct request means, and step 206*a* or 208*a* is irregular data sending means, and step 209*a* is regular data sending means, and step 212*a* is time-out check means.

FIG. 3 is a flowchart for description of operations about data sending from the sub CPU 10*b* to the main CPU 10*a*. In FIG. 3, step 300*b* is an operation start step activated by an occurrence of an interruption to the sub CPU 10*b* in response to an operation of the second interruption interval timer means 17*b* in FIG. 1, and step 303*b* is a step of determining a state of a flag (not shown) for storing whether any data sending is directly requested to the opposed CPU or not, and step 304*b* is a step of acting if the sending request is present in step 303*b* and sending a request content command of an address of sending request data, and step 305*b* is a step of acting if the sending request is absent in step 303*b* and determining a state of a flag (not shown) for storing necessity whether data desired to send relative to the opposed CPU by an interruption is present or not.

Step 306*b* is a step of acting if the necessity of interruption sending is present in step 305*b* and sending irregular data, and step 307*b* is a step of acting if the necessity is absent in step 305*b* and determining a state of a flag (not shown) for storing whether data sending has been requested by an interruption from the opposed CPU or not, and step 308*b* is a step of acting if the requested data is present in step 307*b* and sending the requested data, and step 309*b* is a step of acting if the requested data is absent in step 307*b* and sending regular data, and step 310*b* is a step of acting if the data or command has been sent in steps 304*b*, 306*b*, 308*b*, 309*b* and starting the second data interval timer 20*b* in FIG. 1.

Incidentally, various kinds of the sending data are constructed of a command showing the contents or a frame configuration of the sending data, an address of the sending data or data stored in said address.

On the other hand, step 300*a* is an operation start step of the side of the main CPU 10*a*, and said start step is activated in response to an operation of the first serial-parallel converter 19*a* and the first interruption control means 18*a* in FIG. 1.

Step 301*a* is a step of receiving various kinds of sending data or sending commands from the sub CPU 10*b* in the side of the main CPU 10*a*, and step 302*a* is a determination step of checking the contents of a series of data received in step 301*a*, and step 303*a* is a step of acting if the received data is abnormal in step 302*a* and sending a resending request as an answer to the sub CPU 10*b*, and step 304*a* is a step of acting if the received data is normal in step 302*a* and sending the fact that the data has normally been received as an answer to the sub CPU 10*b*, and step 305*a* is an operation end step.

Incidentally, sending of verification answer information in step 303*a* or step 304*a* is performed by an interruption during an interim of various data sending of the side of main CPU 10*a* in FIG. 2.

Step 311*b* of the side of the sub CPU 10*b* is a step of receiving a verification answer from the side of the main CPU 10*a*, and step 312*b* is a step of determining whether the second data interval timer 20*b* activated in step 310*b* exceeds predetermined time or not, and step 313*b* is a step of acting if step 312*b* determines that a time-out has occurred and operating the second memory element 24*b* in FIG. 1, and step 314*b* is a determination step of acting if a time-out has not occurred in step 312*b* and returning to step 311*b* if the verification answer from the main CPU 10*a* is not received and proceeding to step 315*b* if the verification answer is received, and step 315*b* is a determination step of returning to step 303*b* if the contents of the verification answer in step 311*b* are a data resending request and proceeding to step 316*b* if the contents of the verification answer are a normal receiving.

Step 316*b* is a step of determining a state of a flag (not shown) for storing whether a series of sending has been completed or not, and step 317*b* is a step of acting if step 316*b* determines that the sending has been completed and resetting various kinds of the flags, and step 318*b* is a step of acting if step 316*b* determines that the sending has not been completed and updating to set an address of data to be sent subsequently, and step 319*b* is a step of operating subsequent to steps 313*b*, 317*b*, 318*b* and resetting the second data interval timer 20*b* activated in step 310*b*, and step 320*b* is an end step subsequent to this.

Incidentally, the sub CPU 10*b* checks the contents of the control constants within the second RAM memory 12*b* at the time of starting operation and if an error occurs in this, an interruption request is performed in step 303*b* and a request command is sent in step 304*b*.

As a result of that, the control constants required in step 208*a* of FIG. 2 are sent from the main CPU 10*a* to the sub CPU 10*b*.

In the description above, step 302*a* is sum check means, and step 303*a* is resending request means, and step 304*b* is direct request means, and step 306*b* or 308*b* is irregular data sending means, and step 309*b* is regular data sending means, and step 312*b* is time-out check means.

In the embodiment, when a communication abnormality (time-out) of the main CPU 10*a* is detected by the second data interval timer 20*b*, information obtained from the main CPU 10*a* is indefinite in the side of the sub CPU 10*b*, as self-defense measures, the second memory element 24*b* is operated to stop a part of outputs by the second output gate 16*b* or the second alarm and indicator 28*b* is operated, but in this case, the main CPU 10*a* may be reset and restarted.

Also, output stops of the respective sides are made by the first and second memory elements 24*a* and 24*b*, but, for example, the mutually associated outputs can be stopped so that not only the first output gate 16*a* but also the second output gate 16*b* are stopped in response to an operation of the first memory element 24*a*.

Further, the first and second output gates 16*a* and 16*b* may be constructed so as to break an electromagnetic relay provided in a driving circuit of a specific vehicle built-in load.

Also, in the embodiment, it is constructed so that once an abnormality of the watch dog signal or a communication abnormality occurs, this is stored and an output stop or an alarm display is made, but a counter circuit constructed so as to make the output stop or the alarm display when these abnormalities occur plural times may be provided.

Further, the first and second RAM memory 12*a* and 12*b* are constructed so that even if the power switch 3 is broken and an operation of a vehicle is stopped, power is fed from the first power terminal 2*a* and the contents of the memory are held.

However, in case that a voltage of the vehicle built-in battery 2 abnormally decreases due to long-time parking with a room lamp turned on accidentally or a battery terminal is removed in any maintenance work, the contents of the RAM memory disappear.

In this case, the control constants required in the sub CPU 10*b* are transferred from the first nonvolatile memory 11*a* to the second RAM memory 12*b* by a request from the sub CPU 10*b* resulting from a data abnormality at the time of starting operation, but various kinds of learning data within the main CPU 10*a* or the sub CPU 10*b* cannot be recovered.

As the measures, it is constructed so that an output contact of a power relay is used instead of the power switch 3 of FIG. 1 and said power relay is instantly operated and delayed to be returned in response to an operation of the power switch, and thereby a voltage is supplied to the second power terminal for a while after breaking of the power switch and during this period, for example, the contents of the second RAM memory 12*b* can be saved to the third nonvolatile memory 31 such as EE-PROM and be transferred from the third nonvolatile memory 31 to the second RAM memory 12*b* at the time of operation resumption.

This is also similar to the side of the first RAM memory 12*a*, and nonvolatile memory (not shown) may be connected to the first data bus 30*a*.

In the embodiment described in FIGS. 2 and 3, there are provided the regular data sending means 209*a*, 309*b*, the spontaneous irregular data sending means 206*a*, 306*b* and the passive irregular data sending means 208*a*, 308*b* in both the main CPU 10*a* and the sub CPU 10*b*, but spontaneous irregular sending data may be regularly sent as a part of regular sending data regardless of the presence or absence of a change in the contents of the irregular sending data, and a direct request to the opposed CPU is made valid, for example, only for the case from the main CPU 10*a* to the sub CPU 10*b*, and various modified embodiments can be used.

Also, the main CPU 10*a* can be constructed so as to always send the control constants at the time of starting operation.

As described above, according to the invention as defined in the first aspect of the invention, a vehicle built-in electronic control apparatus fed from a vehicle built-in battery through a power switch comprises a main CPU including first nonvolatile memory in which at least first control programs and control constants in correspondence with a controlled vehicle are written from an external tool, first RAM memory for calculation processing and first input/output ports, a sub CPU including second nonvolatile memory in which second control programs are written, second RAM memory for calculation processing and second input/output ports, and a serial-parallel converter for full duplex two-way serial communication for mutually conducting data communications between the main CPU and the sub CPU in operation of the controlled vehicle, and at the time of starting operation of the controlled vehicle, a part of the control constants stored in the first nonvolatile memory is transferred to the second RAM memory through the serial-parallel converter for the serial communication and the sub CPU performs predetermined calculation based on the contents of the second control programs of the second nonvolatile memory and the contents of the control constants transferred to the second RAM memory, so that the main CPU serving the whole control can change the control programs or control constants in correspondence with types of the controlled vehicle while the sub CPU serving specific functions the control constants in correspondence with types of the controlled vehicle, with the result that standardization of the whole control apparatus can be achieved and at the time of starting operation, only the control constants maybe transferred and thus there is an effect of becoming in an operable state in a short time even in the case of the serial communication.

Also, since various control data communications mutually between each the CPU are conducted by the serial communication during operation, functions can be surely shared and also, there is an effect in that the input/output ports of each the CPU for mutual communication do not increase.

Also, according to the invention as defined in the second aspect of the invention, there are provided a second power terminal for feeding power to each the CPU and the memory, and a first power terminal which is connected to the vehicle built-in battery without intervention of the power switch and feeds power to at least the second RAM memory, and even when the power switch is broken, the contents of at least the second RAM memory are held by the feeding from the first power terminal, so that except for the state immediately after the control programs or control constants have been newly written or rewritten to the first nonvolatile memory using the external tool, there is generally no need for a transfer of the control constants to the second RAM memory, and only in case that a vehicle built-in battery terminal is opened during parking or an abnormal decrease in voltage of the vehicle built-in battery occurs, an abnormality of the control constants may be detected and resent, and thus there is an effect in that useless sending of the control constants is eliminated.

Also, according to the third aspect of the invention, there is further provided third nonvolatile memory, and the contents of the second RAM memory are saved in the third nonvolatile memory at the time of breaking the power switch and are transferred from the third nonvolatile memory to the second RAM memory at the time of again turning on the power switch, so that except for the state immediately after the control programs or control constants have been newly written or rewritten to the first nonvolatile memory using the external tool, there is generally no need for a transfer of the control constants to the second RAM memory, and even in case that a vehicle built-in battery terminal is opened during parking or an abnormal decrease in voltage of the vehicle built-in battery occurs, there is no need for the transfer of the control constants and thus there is an effect in that useless sending of the control constants is eliminated.

Also, according to the fourth aspect of the invention, the main CPU and the sub CPU comprise control constant sending means for sending the control constants stored in the first nonvolatile memory to the sub CPU when the contents of the first nonvolatile memory have been changed at the time of starting operation of the controlled vehicle, direct request means capable of performing an interruption request of data sending from the sending side CPU to the receiving side CPU when the contents of the first nonvolatile memory have not been changed, irregular data sending means for sending the sending data as irregular data in the case that the interruption request by this direct request means is absent but there is a need for interruption sending from the sending side CPU to the receiving side CPU and the case that there is no need for the interruption sending but a data request from the receiving side CPU to the sending side CPU is present, and regular data sending means for regularly sending the sending data as regular data in the case that all the interruption request by the direct request means, the need for the interruption sending and the data request from the receiving side CPU to the sending side CPU are absent, so that regular data communications are regularly conducted between both the CPUs at all times and sending of the irregular data occurring exceptionally or sending of requested data is interposed as necessary and thus, there is an effect capable of conducting communications of necessary data efficiently with a high degree of freedom.

Also, unless the contents of the first nonvolatile memory are changed, there is generally no need for a transfer of the control constants and there is an effect in that the control apparatus becomes in an operable state in immediate response to power-on of the power switch.

Also, according to the fifth aspect of the invention, a direct memory access controller is connected to at least one data bus of the sides of the main CPU or the sub CPU and sending data received through the serial-parallel converter for the serial communication is stored in the receiving side RAM memory without intervention of the receiving side CPU, so that even while the receiving side CPU of serial communication data executes the primary vehicle control program, the serial communication data can be automatically stored in the receiving side RAM memory for a period in which the data bus is not used and there is an effect capable of simply conducting high-speed communication.

Also, according to the sixth aspect of the invention, the main CPU and the sub CPU comprise sum check means for making an error check of received data by the serial-parallel converter for the serial communication in the receiving side CPU, resending request means for requesting the resending of the received data to the sending side CPU if this sum check means determines that an error is present in the received data, and time-out check means for determining whether an interval between sending start time from the sending side CPU to the receiving side CPU and verification answer receiving time of the received data from the sum check means is within a predetermined time interval or not, so that if the error is present in the received data, this is corrected by the resending request means and for an abnormal state of the opposed CPU, this can be recognized by the time-out check means, with the result that each the CPU is constructed so as not to perform control based on the wrong control constants or control data and there is an effect capable of ensuring safety.

Also, according to the seventh aspect of the invention, the main CPU comprises reset output means for monitoring a watch dog signal of the sub CPU and a time-out check result of communication and generating a reset pulse output at the time of operation abnormality of the sub CPU to restart the sub CPU, and a watch dog timer circuit for monitoring a watch dog signal of the main CPU and generating a reset pulse output at the time of operation abnormality to restart the main CPU, so that in the sub CPU, runaway monitoring by the watch dog signal and communication abnormal monitoring by the time-out check are performed by the main CPU and at the time of abnormal conditions, the sub CPU is immediately reset and restarted.

Also, in the main CPU, runaway monitoring is performed by the watch dog timer circuit and at the time of abnormal conditions, the main CPU is immediately reset and restarted and also, if the communication time-out check result of the main CPU by the sub CPU is a communication abnormality, only in case that the cause is due to a runaway of the main CPU, it is constructed so that the main CPU is reset and restarted as a result of the runaway monitoring.

By such reset means, it is constructed so as not to reset the main CPU by the sub CPU which does not know the whole control state of the vehicle and thus the whole safety is improved and also, there is an effect capable of effectively making a control share.

Also, according to the eighth aspect of the invention, there are provided a memory element reset by breaking or again turning on the power switch while storing generation of the reset pulse output, an output stop circuit for stopping a driving of a part of loads in response to an operation of this memory element, and alarm and indication means for giving an alarm and indication of operation abnormality in response to the operation of the memory element, so that even when it is considered that the CPU is reset due to a runaway or a communication abnormality and is immediately restarted to recover to a normal operation, safety is not lost since a part of control outputs is stopped, and an operator can recognize this by the alarm and indicator.

When this is a transient abnormality due to noise, normal recovery is performed by again turning on the power switch, but when frequent abnormal operations occur, material for prompting maintenance and inspection is obtained and there is an effect capable of ensuring safety.

What is claimed is:

1. A vehicle built-in electronic control apparatus fed from a vehicle built-in battery through a power switch, comprising:

a main CPU;

a first nonvolatile memory for the main CPU, storing at least first control programs and control constants of the controlled vehicle, adapted to be written from an external tool;

a sub CPU;

a second nonvolatile memory for the sub CPU, storing second control programs;

a RAM memory, for calculation processing of the sub CPU; and a serial-parallel converter for full duplex two-way serial communication for mutually conducting data communications between the main CPU and the sub CPU in operation of the controlled vehicle;

control constant sending means for sending the control constants stored in the first nonvolatile memory to the sub CPU when the contents of the first nonvolatile memory have been changed at the time of starting operation of the controlled vehicle;

irregular data sending means for sending the sending data as irregular data when a data request from the receiving side CPU to the sending side CPU is present; and regular data sending means for regularly sending the sending data as regular data by the sending side CPU even when the data request from the receiving side CPU to the sending side CPU is absent;

wherein:

at the time of starting the operation of the controlled vehicle, only a part of the control constants in the first nonvolatile memory is transferred, through the serial-parallel converter, to the second RAM memory; and then the sub CPU performs a predetermined calculation based on:

the contents of the second control programs of the second nonvolatile memory, and the contents of the control constants transferred to the second RAM memory from the first nonvolatile memory.

2. A vehicle built-in electronic control apparatus as defined in claim 1, wherein there are provided a second power terminal for feeding power to each the CPU and the memory, and a first power terminal which is connected to the vehicle built-in battery without intervention of the power switch and feeds power to at least the second RAM memory, and even when the power switch is broken, the contents of at least the second RAM memory are held by the feeding from the first power terminal.

3. A vehicle built-in electronic control apparatus as defined in claim 1, wherein there is further provided third nonvolatile memory, and the contents of the second RAM memory are saved in the third nonvolatile memory at the time of breaking the power switch and are transferred from the third nonvolatile memory to the second RAM memory at the time of again turning on the power switch.

4. A vehicle built-in electronic control apparatus as claimed in claim 1, wherein:

the main CPU and the sub CPU comprise direct request means capable of performing an interruption request of data sending from the sending side CPU to the receiving side CPU when the contents of the first nonvolatile memory have not been changed; and the irregular data sending means sends the sending data as irregular data;

when the interruption request by this direct request means is absent but there is a need for interruption sending from the sending side CPU to the receiving side CPU, and when there is no need for the interruption sending but a data request from the receiving side CPU to the sending side CPU is present.

5. A vehicle built-in electronic control apparatus as claimed in claim 1, wherein a direct memory access controller is connected to at least one data bus of the sides of the main CPU or the sub CPU and sending data received through the serial-parallel converter for the serial communication is stored in the receiving side RAM memory without intervention of the receiving side CPU.

6. A vehicle built-in electronic control apparatus as claimed in claim 1, wherein the main CPU and the sub CPU comprise sum check means for making an error check of received data by the serial-parallel converter for the serial communication in the receiving side CPU, resending request means for requesting the resending of the received data to the sending side CPU if this sum check means determines that an error is present in the received data, and time-out check means for determining whether an interval between sending start time from the sending side CPU to the receiving side CPU and verification answer receiving time of the received data from the sum check means is within a predetermined time interval or not.

7. A vehicle built-in electronic control apparatus fed from a vehicle built-in battery through a power switch, comprising:

a main CPU;

a first nonvolatile memory for the main CPU, storing at least first control programs and control constants of the controlled vehicle, adapted to be written from an external tool;

a sub CPU;

a second nonvolatile memory for the sub CPU, storing second control programs;

a RAM memory, for calculation processing of the sub CPU;

a serial-parallel converter for full duplex two-way serial communication for mutually conducting data communications between the main CPU and the sub CPU in operation of the controlled vehicle;

memory element; and an output stop circuit;

wherein:

at the time of starting the operation of the controlled vehicle, only a part of the control constants in the first nonvolatile memory is transferred, through the serial-parallel converter, to the second RAM memory;

the sub CPU performs a predetermined calculation based on the contents of the second control programs of the second nonvolatile memory, and the contents of the control constants transferred to the second RAM memory from the first nonvolatile memory;

the main CPU comprises:

reset output means, for monitoring a watch dog signal of the sub CPU and a time-out check result of communication, and for generating a reset pulse, output at the time of operation abnormality of the sub CPU, to restart the sub CPU, and a watch dog timer circuit, for monitoring a watch dog signal of the main CPU, and generating a reset pulse, output at the time of operation abnormality, to restart the main CPU;

the memory element is reset by the generation of the respective reset pulse output; and the output stop circuit stops a driving of at least a part of the loads in response to an operation of the memory element.

8. A vehicle built-in electronic control apparatus as defined in claim 7, wherein the memory element is reset by breaking or again turning on the power switch, and there is provided alarm and indication means for giving an alarm and indication of operation abnormality in response to the operation of the memory element.

* * * * *